March 21, 1939.  C. H. BRADT  2,151,080
DUPLICATING APPARATUS
Filed March 17, 1937
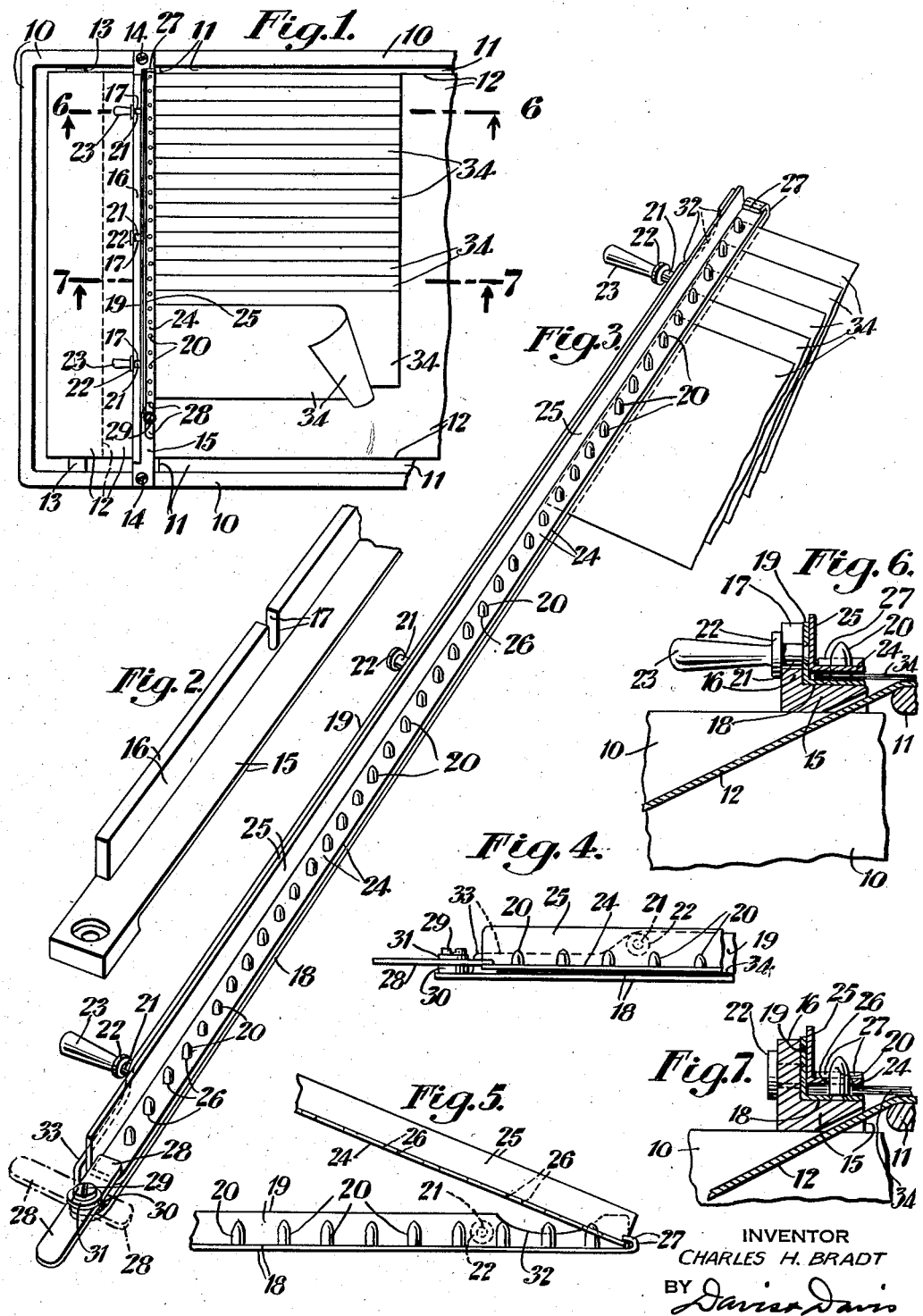
INVENTOR
CHARLES H. BRADT
BY *Davis & Davis*
ATTORNEYS Patented Mar. 21, 1939

2,151,080

UNITED STATES PATENT OFFICE 2,151,080

DUPLICATING APPARATUS

Charles H. Bradt, Groton, N. Y., assignor to L. C. Smith & Corona Typewriters, Inc., Syracuse, N. Y., a corporation of New York Application March 17, 1937, Serial No. 131,384

12 Claims. (Cl. 101—131)

This invention relates to improvements in duplicating apparatus, and more particularly to duplicating apparatus of the hectograph type.

In using a duplicating apparatus of the hectograph type it is desirable that the negative impression from which the copies are to be taken be transferred to a definite position on the surface of the gelatin or other duplicating or copying medium, and that each copy sheet which is to receive a copy from the negative impression be laid and impressed upon the gelatin in a definite predetermined position with relation to the negative impression. It is also desirable that one using the apparatus shall be able to produce the negative impression on the duplicating medium either by a transfer of ink from a single master sheet alone, or by a transfer of ink from a plurality of master sheets assembled either in overlapping or "shingled" relationship or in adjacent non-overlapping relationship, so that the negative record transferred may consist, at will, of either the entire hectograph ink record on a single master sheet, the entire hectograph ink record on all of a plurality of master sheets, or selected parts of the hectograph ink record from a plurality of master sheets.

The invention has for certain of its purposes the provision of a hectograph duplicator with simple and efficient means whereby the above desirable ends may be attained; to provide improved and efficient means for facilitating master sheet laying and stripping; and to provide simple and efficient means for holding a plurality of master sheets in selected desired adjacent and non-overlapped assembled relationship or in selected desired overlapped assembled relationship and for facilitating proper laying and impressing of the assembled master sheets upon the hectograph copying medium and stripping of the assembled master sheets from said medium.

Other purposes of the invention are to attain such additional advantages as appear from the following description of the preferred embodiment of the invention illustrated in the accompanying drawing, and to attain any such other advantages as are inherent in the said preferred embodiment of the invention.

Only so much of a duplicator of the hectograph type as is necessary for a clear understanding of the invention is shown in the drawing in which:

Fig. 1 is a fragmentary top plan view of the duplicator, showing the front portion thereof;

Fig. 2 is a fragmentary perspective view of the margin bar of the duplicator, showing one end portion of the margin bar;

Fig. 3 is a perspective view of the master sheet holding and stripping device, showing a plurality of master sheets held therein in overlapping or "shingled" relationship;

Figs. 4 and 5 are fragmentary detail rear views of the master sheet holding and stripping device;

Fig. 6 is a detail sectional view on the line 6—6 of Fig. 1; and

Fig. 7 is a detail sectional view on the line 7—7 of Fig. 1.

The invention is shown as embodied in a duplicating apparatus of the hectograph type having a supporting frame 10 carrying a stationary flat bed 11 over which is stretched the usual gelatin or other suitable duplicating band or copying medium 12, which band may be reeled, as usual, from one to the other of two spindles journalled in the sides of the frame below and beyond the front and rear ends of the bed, the forward one of which spindles is shown at 13 in Fig. 1. The foregoing parts are well known and the improvements will now be described.

Extending transversely of the frame forward of and close to the front end of the bed is a margin bar which is held at its ends to the frame by suitable means such as the screws 14. Said margin bar consists of a horizontally disposed bar or web 15 having along its forward edge an upstanding abutment flange or web 16. The top flat horizontal face of web 15 of the margin bar 15—16 is preferably approximately level with the top face of the bed 11 or the duplicating band thereon. Flange 16 of the margin bar is provided intermediate its ends with three vertically extending and preferably equally spaced slots 17 open at their upper ends.

The master sheet holding and stripping device includes a pin-carrying sheet metal member comprising a long, narrow and flat pin-carrying web 18, preferably not exceeding in length the length of the margin bar web 15, and preferably not exceeding in width the width of the flat top face of web 15 of the margin bar, and a long, narrow and flat abutment web 19 along one edge of web 18 and lying in a plane perpendicular to web 18. A series of short pins 20 rigidly affixed to web 18 are disposed perpendicularly to said web and extend therefrom in the same direction as does web 19, said pins being spaced uniformly apart along web 18 and uniformly from web 19. Preferably, the height of web 19 is approximately that of the web 16 of the margin bar. Fixed to web 19 of the pin-carrying member, and protruding therefrom perpendicularly thereto at the face of the web opposite that at which pins 20 are located, are three rigid studs 21 formed with heads 22 spaced from web 19 a distance corresponding to the thickness of web 16 of the margin bar. Studs 21 are spaced apart in a straight line along web 19 a distance corresponding with the spacing of slots 17 in web 16 of the margin bar, and the shanks of the studs are adapted to slidably fit in said slots so that the pin carrying member may be seated on web 15 of the margin bar with pins 20 projecting upward and with web 19 detachably clamped against the rear face of web 16 of the margin bar.

The pin-carrying member may thus be detachably and instantly fastened to the margin bar with said member seated on the margin bar behind flange 16 of the margin bar and held against fore-and-aft and lateral movements relatively to said bar. The heads 22 of the two end ones of the studs 21 are prolonged or extended away from web 19 to form handles or finger pieces 23 for facilitating connecting and disconnecting the margin bar and pin-carrying bar.

The master sheet holding and stripping device also preferably includes a second sheet metal member of approximately the same length and cross-section as the pin-carrying member for use to prevent accidental disengagement of a master sheet or sheets from pins on the pin bar. This sheet-locking member comprises the two flat webs 24 and 25 disposed perpendicularly to each other, the web 24 having therein a row of perforations 26 adapted to receive therethrough the pins 20 and so spaced from web 25 that the latter will abut web 19 when web 24 is fitted over the pins in master sheet locking position.

Sheet-locking member 24—25 is releasably held in sheet locking position by means of a hook lug 27 turned upward and inward from the left hand end of web 18 so as to slightly overlie the left hand end of that face of the web 18 at which the pins are located. The spacing between the lug and web 18 is sufficient to slightly loosely receive one end of web 24, and the overhanging part of the hook lug is spaced from web 19 a distance corresponding to the thickness of web 25 for reception of the latter web between the web 19 and the adjacent side edge of the hook lug. A separably interlocked hinge connection between the pin-carrying member and sheet locking member is thus provided at the left hand end of the master sheet holding and stripping device which will permit connection and separation of said members at said end by manipulating the members as indicated in Fig. 5.

At the right hand end of said device said members are releasably lockable together by a flat and straight sheet metal latch bar or two-armed latch lever 28 held to the right hand end of web 18 by a vertical pivot 29. A spacing collar or bushing 30 holds lever 28 spaced upward from the pin-carrying face of web 18 sufficiently to permit swinging of one end of the lever over the right hand end of web 24 against web 25, and the axis of the pivot is such that said lever cannot be swung far enough in unlatching direction to clear web 24 when the master sheet holding device is mounted on the margin bar, margin bar flange 16 serving to prevent unlatching of lever 28 while the device is mounted on the margin bar. The position of the pivot 29 is such that, as shown in dotted lines in Fig. 3, the right hand end of flange 19 will not prevent unlatching of latch 28 when the master sheet holding device is detached from the margin bar. A friction washer 31 is preferably provided for frictionally holding the latch lever in any rocked position of the lever. Web 19 of the pin-carrying member is preferably cut away at its upper edge adjacent its ends, as shown at 32 and 33 to facilitate grasping of web 25 of the member 24—25 in connecting and disconnecting these two members of the master sheet holding and stripping device.

Master sheets 34 containing matter in hectograph copy ink, and to be held by the master sheet holding and stripping device, are provided along one edge thereof with a row of perforations of such size as to receive the pins 20 and spaced according to the spacing of the pins. It will be obvious that, with the holding and stripping device detached from the margin bar, a single such master, or a plurality of such masters, may be engaged with the pins on the pin-carrying member, after which the member 24—25 is latched to the pin-carrying member to prevent accidental disengagement of the master sheet or sheets from the pins during subsequent handling of the holding and stripping device. With the master sheet or sheets so held in the device, the device is attached to the margin bar by pushing the shanks of studs 21 down in the margin bar slots 17. The master sheet or sheets, which are thus anchored at one end to the margin bar and free at the opposite end, are thereafter smoothed out upon and pressed down smoothly on the gelatin by hand or in any other suitable way, such as by means of a platen roller, the smoothing and pressing action being exerted on the sheets progressively from the anchored to the free ends thereof. The ink transfer having been effected by impressing the held master sheet or sheets on the gelatin copying medium, the sheet or sheets are stripped from the medium by lifting the holding and stripping device from its interlocked engagement with the margin bar and carrying it rearward or rearward and upward until the sheets are fully stripped. Thereafter, each copy is made in the usual manner by positioning one end of a copy sheet on the margin bar web 15 with the adjacent end edge of said sheet against web 16 of the margin bar and then smoothing out and impressing the remainder of the sheet on the gelatin medium. Each copy sheet is, of course, stripped as usual from the gelatin medium before applying the next copy sheet to the medium.

It will be obvious that, by employing the detachable master sheet holding and stripping device and master sheets appropriately perforated along one edge, a plurality of master sheets may be anchored at one edge to the margin bar in predetermined relation to each other and to said bar and the copy medium, and that said plurality of sheets may be so anchored with the sheets in adjacent non-overlapped relation or in overlapped "shingled" relation. It will also be obvious that the margin bar 15—16 determines the impressed position both of the master sheets and copy sheets on the gelatin. Where a single master sheet is employed in forming the inked negative on the gelatin, said master may be positioned and impressed on the gelatin in the same manner as the copy sheets with the aid of the margin bar alone, if desired, whether the master sheet has a perforated edge or not.

It will also be observed that the detachable master sheet holding and stripping device will securely hold the assembled master sheets thereto during the sheet applying, impressing and stripping operations. It will further be observed that said device may be readily applied to existing forms of machines with very slight changes in the margin bar of any such machine, since the margin bar shown is of common construction except for the provision of the slots 17 in the sheet positioning and aligning web 16 of the margin bar.

What I claim is:

1. A duplicating apparatus of the kind having a margin bar provided with means for positioning a sheet at one end of the latter for impression of said sheet on a hectograph copying surface presented adjacent said bar, wherein said margin bar is provided with additional detachable means for anchoring an assembly of sheets thereto for positioning the assembled sheets for impression on said presented copying surface, whereby said bar with said additional means attached thereto may be used to position a sheet assembly, and said bar may be used to position a single sheet with said additional means detached from the bar.

2. A duplicating apparatus, as claimed in claim 1, wherein the margin bar has upstanding abutment means for engagement by the edge of a sheet, and also has sheet supporting means extending from the abutment means toward the presented copying surface and providing a seat for said detachable means.

3. A duplicating apparatus of the kind in which a hectograph copying medium is supported from the main frame of said apparatus to present a copying surface for impression on said presented surface of master and copy sheets, having, in combination, a margin bar mounted on the frame to extend widthwise of the presented copying surface adjacent one end of the latter and provided with fixed means for positioning one end of a sheet for impression of the sheet on the presented copying surface, and a device detachably anchored to said margin bar in predetermined relation to said fixed means and having means for anchoring to said device in predetermined relation to said device one end only of an assembly of master sheets.

4. A duplicating apparatus, as claimed in claim 3, wherein said device is provided with means for releasably locking thereto an assembly of master sheets, whereby said device may be detached from the margin bar after impression of the master sheet assembly and shifted to strip the impressed sheet assembly from the copying surface.

5. A duplicating apparatus of the kind in which a hectograph copying medium is supported from the main frame of the apparatus to present a copying surface for impression on said presented surface of master and copy sheets, having, in combination, a margin bar having a main body portion mounted on the frame to extend widthwise of the presented copying surface adjacent one end of the latter and provided with means fixedly related to said body portion for positioning one end of a sheet for impression of the sheet on said surface, and a sheet-holding and sheet-stripping device extending along and separably interlocked with said margin bar against movement toward and from said copying surface and having means for separably locking to said device one end of each of a plurality of sheets with the locked ends of the sheets selectively positioned along said device and margin bar equal distances from said adjacent end of the presented copying surface.

6. A duplicating apparatus, as claimed in claim 5, wherein said presented copying surface faces upwardly in the frame, said margin bar has an upstanding sheet-edge abutment wall and a sheet-supporting ledge extending from the lower edge of said wall toward and approximately level with said copying surface, said holding and stripping device is seated on said ledge against said wall, said wall has downwardly extending open slots therein, and said device has headed studs the shanks of which extend through said slots to releasably clamp said device to said wall.

7. A duplicating apparatus, as claimed in claim 5, wherein said presented copying surface faces upwardly, said margin bar has an upstanding sheet-edge abutment wall and a sheet-supporting ledge extending therefrom toward said copying surface, and said device comprises two sheet metal bars releasably latched together, one of said bars being seated on said ledge and provided with a row of upstanding pins therealong, and the other of said bars having a row of perforations therein through which said pins extend, said two bars being latchable together with said pins extending through the perforated bar and through sheet ends interposed between the bars.

8. A duplicating apparatus, as claimed in claim 5, wherein said sheet holding and stripping device comprises a member having a row of sheet-anchoring pins, a member having a row of perforations to receive said pins, and means for latching said members together with said pins extending through said perforations and through sheet ends located between the members, and wherein said margin bar blocks unlatching of said members while said device is interlocked with the margin bar.

9. A duplicating apparatus, as claimed in claim 5, wherein said sheet holding and stripping device comprises a member having a row of sheet-anchoring pins, a member for holding anchored sheets on said pins, and coacting means carried by said members for latching them together with the second member in sheet-holding position.

10. A sheet holding and stripping attachment for hectograph duplicators, comprising a rigid member having means for releasably anchoring it to a margin bar of the duplicator and also provided with a row of sheet-anchoring pins, a separable rigid member having a row of perforations to receive said pins, and means for releasably latching said members together with the pins engaged in the perforations and extending through sheets interposed between the members.

11. A convertible margin-determining device for duplicators of the hectograph type comprising a margin bar having integral means for positioning a copy sheet for laying of the latter, and detachable means having provisions for anchoring thereto an assembly of overlapped master sheets for positioning the sheet assembly for laying thereof, said detachable means being releasable from said margin bar for master sheet assembly stripping movement of said means and to condition said bar for copy sheet positioning coaction between a copy sheet and said integral means.

12. A convertible margin-determining device for duplicators of the hectograph type comprising a margin bar having a main body portion for mounting on the duplicator, and a combined margin-determining and sheet-stripping means for master sheets detachably anchored to said margin bar, said main body portion of said margin bar being provided with margin-determining means for copy sheets rendered accessible for use by detachment of said first-mentioned means from said bar.

CHARLES H. BRADT.